United States Patent
Xiang et al.

(10) Patent No.: US 12,507,288 B2
(45) Date of Patent: Dec. 23, 2025

(54) COMMUNICATION METHOD AND DEVICE, AND STORAGE MEDIUM

(71) Applicant: Beijing Xiaomi Mobile Software Co., Ltd., Beijing (CN)

(72) Inventors: Wen Xiang, Beijing (CN); Hanbiao Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 388 days.

(21) Appl. No.: 18/162,369

(22) Filed: Jan. 31, 2023

(65) Prior Publication Data

US 2024/0179761 A1  May 30, 2024

(30) Foreign Application Priority Data

Nov. 24, 2022 (CN) .......................... 202211484492.7

(51) Int. Cl.
| | |
|---|---|
| *H04W 84/12* | (2009.01) |
| *H04W 8/22* | (2009.01) |
| *H04W 48/08* | (2009.01) |
| *H04W 48/16* | (2009.01) |
| *H04W 76/10* | (2018.01) |
| *H04W 76/15* | (2018.01) |

(52) U.S. Cl.
CPC .............. *H04W 76/10* (2018.02); *H04W 8/22* (2013.01)

(58) Field of Classification Search
CPC ....... H04W 76/10; H04W 8/22; H04W 84/12; H04W 48/12; H04W 76/15; H04W 48/08; H04W 48/16
See application file for complete search history.

(56) References Cited

U.S. PATENT DOCUMENTS

| | | | |
|---|---|---|---|
| 2021/0282229 A1* | 9/2021 | Stacey | .................. H04W 88/10 |
| 2022/0330225 A1* | 10/2022 | Hsu | ........................ H04W 72/20 |
| 2022/0337338 A1 | 10/2022 | Homchaudhuri et al. | |

FOREIGN PATENT DOCUMENTS

WO  2021238578 A1  12/2021

OTHER PUBLICATIONS

European Patent Office, Extended European Search Report issued in Application No. 23154140.0, dated Aug. 16, 2023, 15 pages.
Doc.: IEEE 802.11-21/499r4, IEEE P802.11, Wireless LANs, CR for CIDS related to ML IE Usage for Multi link Setup, Mar. 2021, 11 pages.

* cited by examiner

*Primary Examiner* — Joseph E Dean, Jr.
(74) *Attorney, Agent, or Firm* — Finnegan, Henderson, Farabow, Garrett & Dunner, L.L.P.

(57) ABSTRACT

A communication method includes: acquiring access point information of at least one access point; determining a target access point based on the access point information of the at least one access point; determining a target connection manner of establishing a connection with a target access device corresponding to the target access point based on first access point information of the target access point, in which the target connection manner includes at least one of a multi-link connection manner or a wireless connection manner; and establishing the connection with the target access device based on the target connection manner.

20 Claims, 8 Drawing Sheets

COMMUNICATION METHOD AND DEVICE, AND STORAGE MEDIUM

CROSS-REFERENCE TO RELATED APPLICATION

The present application claims the benefit of priority to Chinese Application No. 202211484492.7, filed on Nov. 24, 2022, the contents of which are incorporated herein by reference in their entireties.

TECHNICAL FIELD

The disclosure relates to the field of communication technologies, and in particular, to a communication method, device, and storage medium.

BACKGROUND

With development of wireless local area network (LAN) technologies, wireless devices can support multi-link communication. The multi-link communication refers to that the wireless device supports simultaneous communication on a plurality of frequency bands, or simultaneous communication on different channels of the same frequency band. The wireless device that supports the multi-link communication is commonly called a multi-link device (MLD), and the multi-link device includes a plurality of stations (STAs). The multi-link device can be connected with an access device through a plurality of frequency bands supported by the multi-link device. The access device includes a single-link access device and a multi-link access device. The single-link access device includes a single access point (AP). The multi-link access device includes a plurality of access points, and each access point has a corresponding frequency band.

SUMMARY

According to a first aspect of embodiments of the present disclosure, a communication method is provided and applied to a multi-link device. The method includes: acquiring access point information of at least one access point: determining a target access point based on the access point information of the at least one access point: determining a target connection manner of establishing a connection with a target access device corresponding to the target access point based on first access point information of the target access point, wherein the target connection manner includes at least one of a multi-link connection manner or a wireless connection manner; and establishing the connection with the target access device based on the target connection manner.

According to a second aspect of embodiments of the present disclosure, a communication device is provided. The communication device includes: a processor: and a memory configured to store instructions executable the processor. The processor is configured to: acquire access point information of at least one access point; determine a target access point based on the access point information of the at least one access point: determine a target connection manner of establishing a connection with a target access device corresponding to the target access point based on first access point information of the target access point, wherein the target connection manner comprises at least one of a multi-link connection manner or a wireless connection manner: and establish the connection with the target access device based on the target connection manner.

According to a third aspect of embodiments of the present disclosure, a non-transitory computer readable storage medium is provided. When instructions in the storage medium are executed by a processor of a terminal, the terminal is caused to perform a communication method. The communication method includes: acquiring access point information of at least one access point: determining a target access point based on the access point information of the at least one access point: determining a target connection manner of establishing a connection with a target access device corresponding to the target access point based on first access point information of the target access point, wherein the target connection manner includes at least one of a multi-link connection manner or a wireless connection manner; and establishing the connection with the target access device based on the target connection manner.

It should be understood that the above general description and the following detailed description are merely illustrative and explanatory and are not intended to limit the present disclosure.

BRIEF DESCRIPTION OF DRAWINGS

The accompanying drawings, which are incorporated into and constitute a part of this specification, illustrate embodiments consistent with the present disclosure and, together with the specification, serve to explain the principles of the present disclosure.

DETAILED DESCRIPTION

Figure 1:
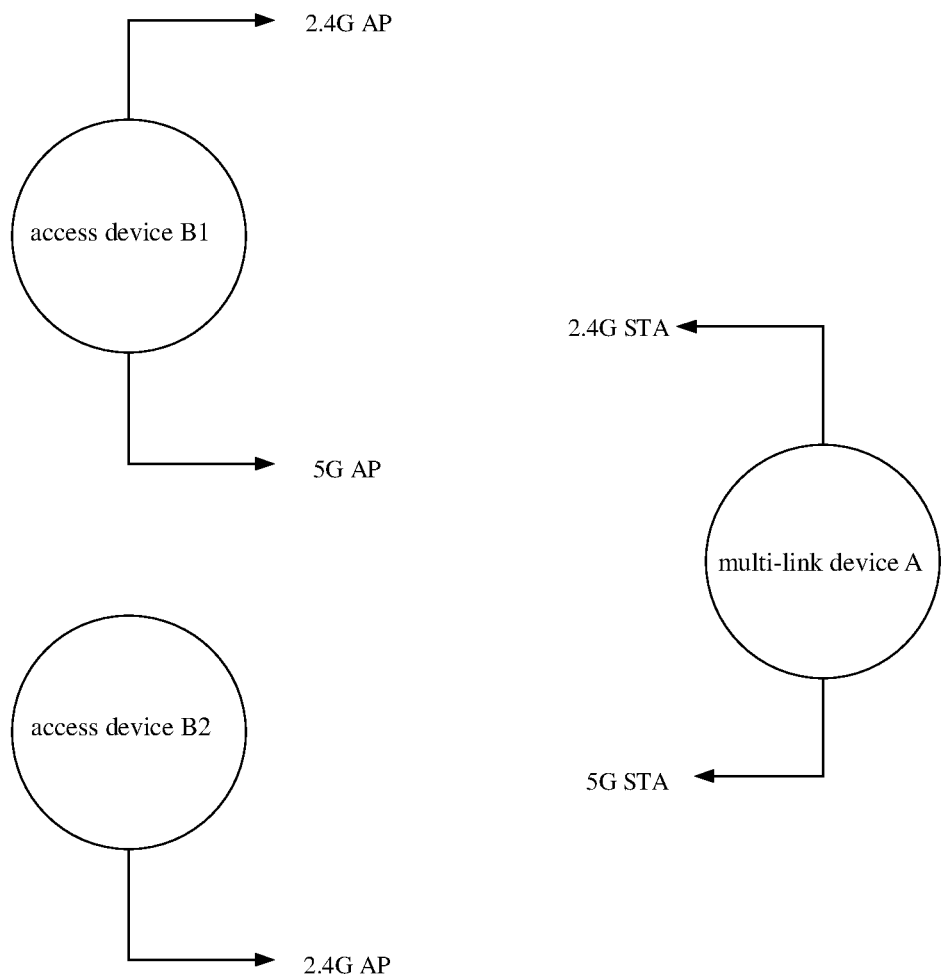
FIG. 1 is a schematic diagram of a communication system according to an embodiment.

Illustrative embodiments will be described here in detail, examples of which are illustrated in the accompanying drawings. When the following description refers to the accompanying drawings, the same numbers in different drawings represent the same or similar elements, unless otherwise specified. The implementations set forth in the following description of the illustrative embodiments do not represent all implementations consistent with the present disclosure.

In the drawings, the same or similar reference numerals refer to the same or similar elements or elements with the same or similar functions throughout the specification. The described embodiments are part of the embodiments of the present disclosure, but not all the embodiments of the present disclosure. The embodiments described below with reference to the accompanying figures are examples and are intended to explain the present disclosure, but should not be construed as limitations of the present disclosure. Based on the embodiments in the present disclosure, all other embodiments obtained by those ordinary skilled in the related art without making creative efforts fall into the scope of protection of the present disclosure. The embodiments of the present disclosure will be described in detail below with reference to the drawings.

When operating with multi-links, a multi-link device generally needs to be connected to an access device that also supports multi-links. Even if there is a better access device, the multi-link device may not be connected to it. Therefore, when the multi-link device faces a plurality of access devices of different types, how to select a relatively better access device for connection is a problem to be solved.

Based on this, embodiments of the present disclosure provide a communication method, so that the multi-link device is no longer limited to being connected with the access device supporting multi-links, but can select a better target access point, and establish a multi-link connection or a wireless connection with a target access device corresponding to the target access point, thus expanding the application scenarios of the multi-link device and realizing the great compatibility.

The communication method according to the embodiments of the present disclosure can be applied to a communication system shown in FIG. 1. As shown in FIG. 1, the communication system includes a multi-link device A, an access device B1 and an access device B2.

The multi-link device includes a plurality of stations (STAs), and each STA supports one frequency band respectively. The multi-link device A shown in FIG. 1 includes a STA that supports 2.4G and a station supports 5G. With the development of technologies, the multi-link device can further include STAs that support 6G-7G (not shown in the drawings), and 2.4G and 5G are only taken as an example for descriptions in the embodiments of the present disclosure.

The access device B1 is a multi-link access device including an access point (AP) supporting 2.4G and an AP supporting 5G. The access device B2 is a single-link access device, and only includes an AP supporting 2.4G. The frequency bands supported by the access points of the access devices B1 and B2 shown in FIG. 1 are not only the frequency bands shown in FIG. 1, but also may be other frequency bands, such as 3.6G, 6G, etc.

In the communication system shown in FIG. 1, if the multi-link device adopts a connection method in the related art, the multi-link device A can only be connected with the access device B1, while the multi-link access device in the embodiments of the present disclosure can be connected with the access device B1, and also be connected with the access device B2.

Figure 2:
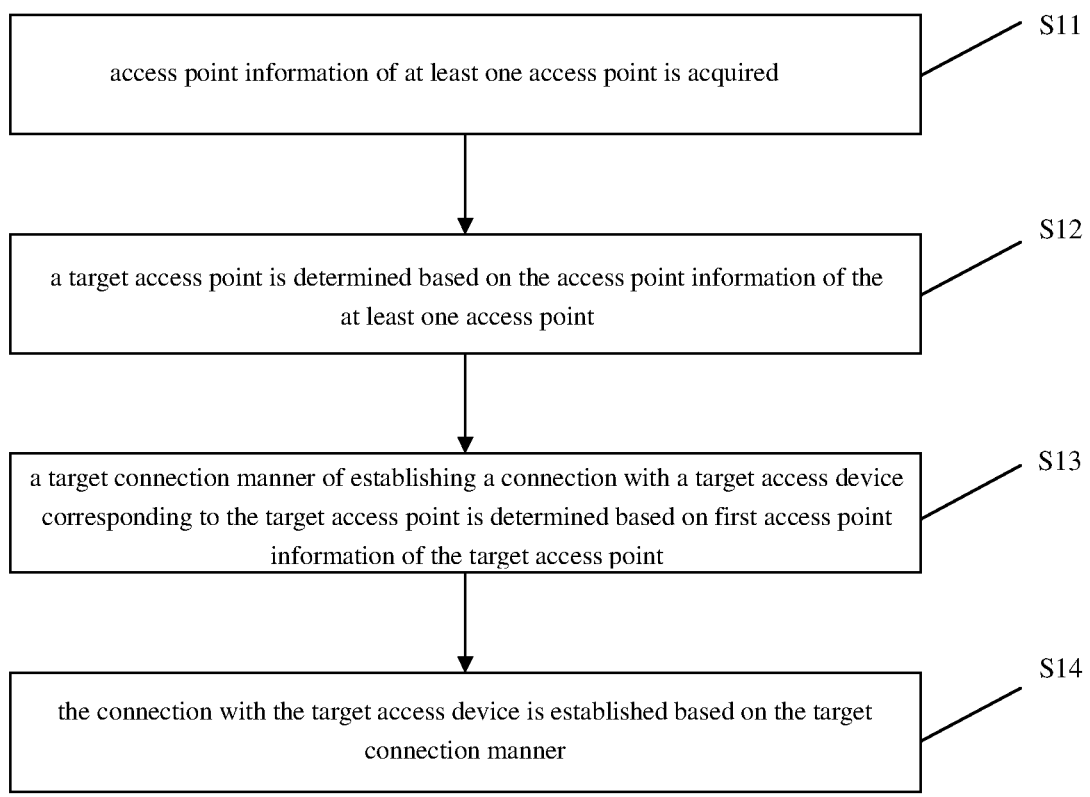
FIG. 2 is a flow chart of a communication method according to an embodiment.

FIG. 2 is a flow chart of a communication method according to an embodiment. As shown in FIG. 2, the communication method is used in a multi-link device and includes the following steps.

At step S11, access point information of at least one access point is acquired.

The access point information includes at least one of the following: a service set identifier (SSID) of the access point, a name of the access point, a frequency band of the access point, a media access control (MAC) address of the access point, an IP address of the access point, a signal strength, or a number of users accessing the access point.

At step S12, a target access point is determined based on the access point information of the at least one access point.

At step S13, a target connection manner of establishing a connection with a target access device corresponding to the target access point is determined based on first access point information of the target access point.

The target connection manner includes a multi-link connection manner or a wireless connection manner.

In the multi-link connection manner, the multi-link device establishes connections with the target access point device on a plurality of frequency bands of a plurality of access points, respectively. In the wireless connection manner, the multi-link device establishes a connection with the target access point device on a single frequency band of a single access point.

At step S14, the connection with the target access device is established based on the target connection manner.

In the embodiments of the present disclosure, the access point information of the at least one access point is acquired, and the target access point is determined based on the access point information of the at least one access point. Further, based on the first access point information of the target access point, the target connection manner of establishing the connection with the target access device corresponding to the target access point is determined. The target connection manner includes the multi-link connection manner and the wireless connection manner. Therefore, according to the solutions of the present disclosure, the multi-link device is no longer limited to being only connected with the access device supporting multi-links, but can select a better target access point and establish the multi-link connection or the wireless connection with the target access device corresponding to the target access point, thereby expanding the application scenarios of the multi-link device and realizing the great compatibility.

How to determine the target connection manner of establishing the connection with the target access device corresponding to the target access point based on the first access point information of the target access point at step S13 will be described below in detail.

Figure 3:
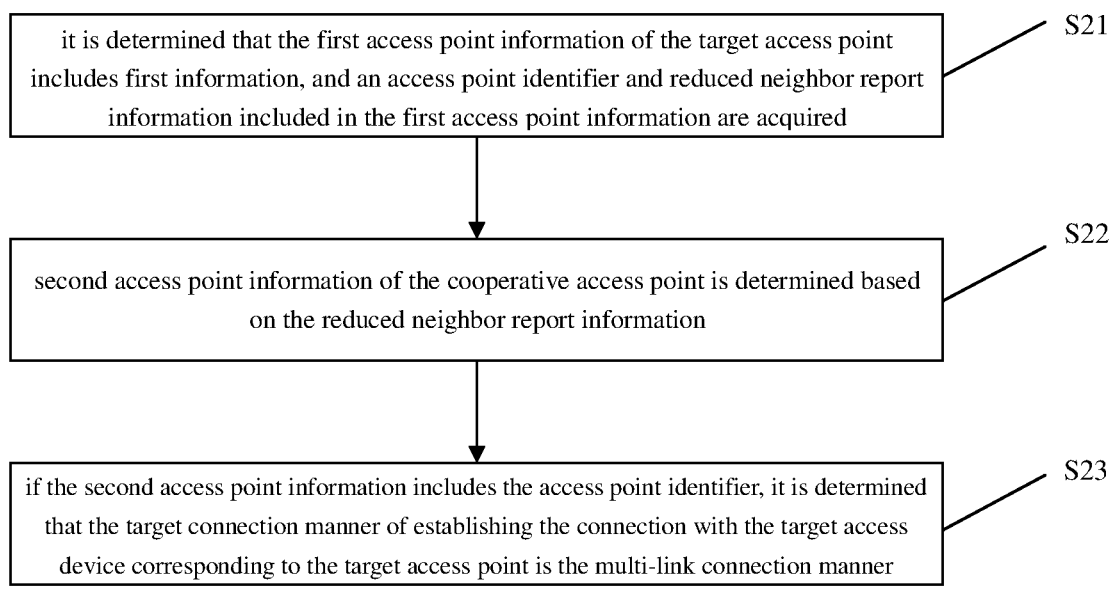
FIG. 3 is a flow chart of a method of determining a target connection manner according to an embodiment.

In some embodiments, based on the first access point information of the target access point, it is determined that the target connection manner of establishing the connection with the target access device corresponding to the target access point is the multi-link connection manner. FIG. 3 shows a flow chart of a method of determining a target connection manner, which includes the following steps.

At step S21, it is determined that the first access point information of the target access point includes first information, and an access point identifier and reduced neighbor report information included in the first access point information are acquired.

The first information is used to indicate a capability of the target access device corresponding to the target access point supporting the multi-link connection manner, the access point identifier is used to identify the target access device corresponding to the target access point, and the neighbor reduction report information is used to indicate second access point information of a cooperative access point of the target access point, in which the target access point and the cooperative access point are associated with the same target access device, and the access points associated with the same target access device have the same access point identifier.

In an embodiment, the first information is a multi-link information element (Multi-Link IE). When the first access point information of the target access point includes Multi-Link IE, the target access device corresponding to the target access point may be considered as a multi-link access device.

At step S22, second access point information of the cooperative access point is determined based on the reduced neighbor report information.

At step S23, if the second access point information includes the access point identifier, it is determined that the target connection manner of establishing the connection with the target access device corresponding to the target access point is the multi-link connection manner.

The second access point information includes a basic multi-link information element, and the access point identifier is included in the basic multi-link information element.

In the embodiments of the present disclosure, if the second access point information of the cooperative access point includes the access point identifier, it indicates that the cooperative access point and the target access point are associated with the same target access device. In this case, the multi-link device can simultaneously establish the connection with the target access device through the target access point and the cooperative access point.

In some embodiments, the neighbor reduction report information includes channel information of the cooperative access point.

In an embodiment, a working channel of the cooperative access point is determined through the reduced neighbor report information, and the second access point information of the cooperative access point is received in the working channel of the cooperative access point.

Figure 4:
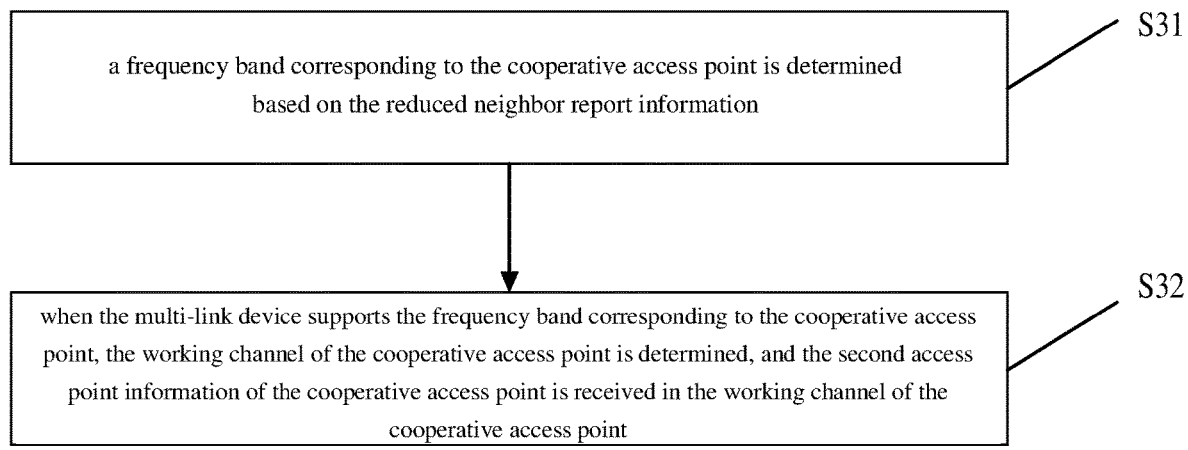
FIG. 4 is a flow chart of a communication method according to an embodiment.

In some embodiments, the working channel of the cooperative access point is determined through the reduced neighbor report information, and the second access point information of the cooperative access point is received in the working channel of the cooperative access point, which can be specifically implemented as following steps, as shown in FIG. 4.

At step S31, a frequency band corresponding to the cooperative access point is determined based on the reduced neighbor report information.

At step S32, when the multi-link device supports the frequency band corresponding to the cooperative access point, the working channel of the cooperative access point is determined, and the second access point information of the cooperative access point is received in the working channel of the cooperative access point.

In the embodiments of the present disclosure, the multi-link device can receive the second access point information of the cooperative access point in the working channel of the cooperative access point, only when the multi-link device supports the frequency band corresponding to the cooperative access point.

In some embodiments, when it is determined that the target connection manner is the multi-link connection manner, the multi-link device establishes the multi-link connection with the target access device on the frequency band corresponding to the target access point and the frequency band corresponding to the cooperative access point based on the multi-link connection manner.

For example, if the frequency bands supported by the multi-link device are 2.4G and 5G, the frequency band corresponding to the target access point is 2.4G, and the frequency band corresponding to the cooperative access point of the target access point is 5G, the multi-link device can simultaneously establish the connection with the target access device through 2.4G of the target access point and 5G of the cooperative access point of the target access point.

In some embodiments, based on the first access point information of the target access point, it is determined that the target connection manner of establishing the connection with the target access device corresponding to the target access point is the wireless connection manner. A method of determining the target connection manner includes the following steps.

If the first access point information of the target access point does not include the first information, and/or the multi-link device does not support the frequency band corresponding to the cooperative access point of the target access point, it is determined that the target connection manner of establishing the connection with the target access device corresponding to the target access point is the wireless connection manner.

In an embodiment, the first information may be the Multi-Link IE. When the first access point information of the target access point does not include the Multi-Link IE, the target access device corresponding to the target access point may be considered as a single-link access device, and the multi-link device cannot perform the multi-link connection in this case.

In another embodiment, the first access point information of the target access point includes the Multi-Link IE, but the multi-link device does not support the frequency band corresponding to the cooperative access point of the target access point. In this case, the multi-link device cannot be connected with the target access device through the cooperative access point, and the multi-link device can only be connected with the target access device through the target access point.

For example, the frequency band supported by the target access point is 2.4G, the frequency band supported by the cooperative access point of the target access point is 5G, and the frequency bands supported by the multi-link device are 2.4G and 6G. It can be seen that the multi-link device does not support the 5G frequency band supported by the cooperative access point of the target access point, and the multi-link device can only be connected with the target access point through 2.4G.

In the embodiments of the present disclosure, if the first access point information of the target access point does not include the first information, and/or the multi-link device does not support the frequency band corresponding to the cooperative access point of the target access point, it is determined that the target connection manner of establishing the connection with the target access device corresponding to the target access point is the wireless connection manner, so that the multi-link device can establish the wireless connection with the target access device on the frequency band corresponding to the target access point. Therefore, the multi-link device is no longer limited to being connected with the access device supporting multi-links, but can establish the multi-link connection or the wireless connection with the target access device corresponding to the target access point based on a better target access point, thus expanding the application scenarios of the multi-link device and realizing the great compatibility.

In some embodiments, when it is determined that the target connection manner is the wireless connection manner, the multi-link device establishes the wireless connection with the target access device on the frequency band corresponding to the target access point based on the wireless connection manner.

In the embodiment of the present disclosure, when it is determined that the target connection manner is the wireless connection manner, the multi-link device can establish the wireless connection with the target access device on the frequency band corresponding to the target access point, so that the multi-link device is no longer limited to only being connected with the access device supporting multi-links, but can establish the multi-link connection or the wireless connection with the target access device corresponding to the target access point based on a better target access point, thus expanding the application scenarios of the multi-link device and realizing the great compatibility.

Figure 5:
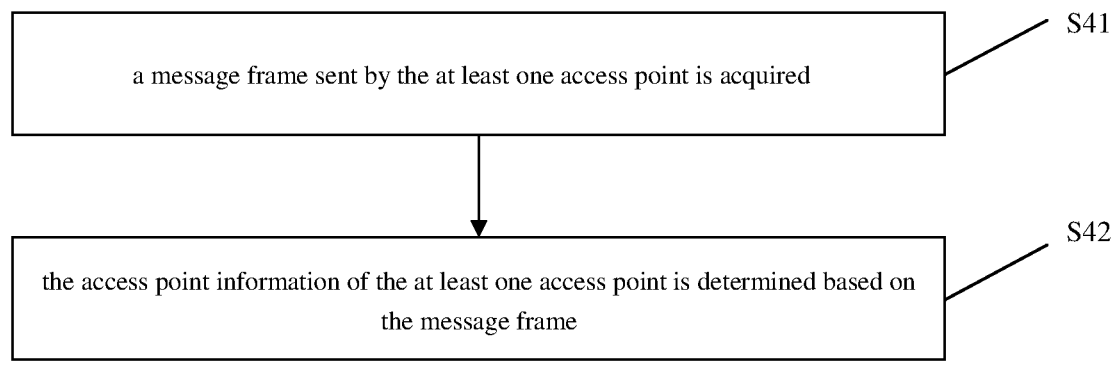
FIG. 5 is a flow chart of a method of acquiring access point information of an access point according to an embodiment.

How to acquire the access point information of the at least one access point at step S11 is described below. FIG. 5 shows a flow chart of a method of acquiring the access point information of the access point, which includes the following steps.

At step S41, a message frame sent by the at least one access point is acquired.

The message frame includes a beacon frame and/or a probe response frame.

At step S42, the access point information of the at least one access point is determined based on the message frame.

In an embodiment, when the multi-link device scans the AP in a passive scanning manner, the multi-link device continuously switches and monitors the beacon frames on various channels, and records the information of all the beacon frames sent by the AP.

The beacon frame is a broadcast frame, and the beacon frame has a one to one correspondence with the access point. The beacon frame includes information of the access point that sends the beacon frame, such as channel information, SSID, and basic service set ID (BSSID) encryption information of the access point that sends the beacon frame. BSSID is MAC address information.

In another embodiment, when the multi-link device scans the AP in an active scanning manner, the multi-link device broadcasts a probe request frame on channels in a supported channel list, and the AP responds with the probe response frame after receiving the probe request frame. The multi-link device acquires the access point information of the surrounding access points based on the probe response frame, such as the name, the basic service set identifier, the received signal strength indication of the access point, etc.

In the embodiments of the present disclosure, the multi-link device can determine the access point information of the at least one access point in the active scanning manner or the passive scanning manner.

In some embodiments, after acquiring the access point information of the at least one access point, the multi-link device generates a candidate connection list which is displayed in the multi-link device, and determines the target access point based on a preset rule or a user's selection.

Figure 6:
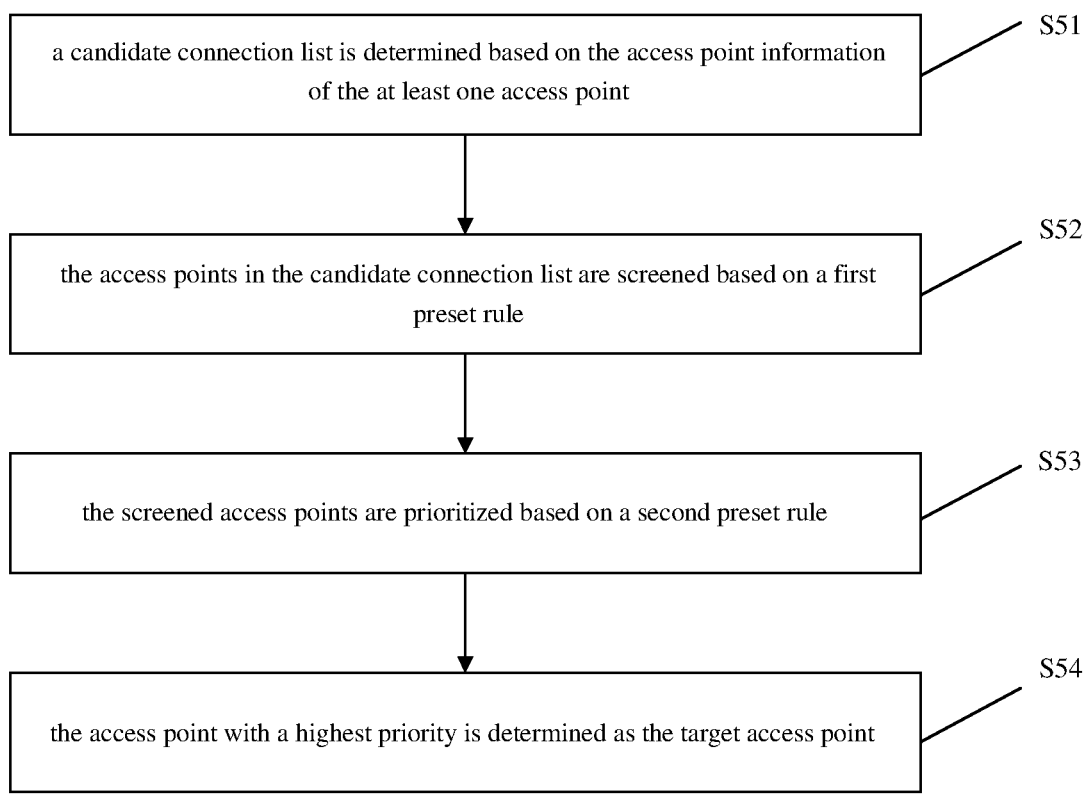
FIG. 6 is a flow chart of a method of determining a target access point according to an embodiment.

By taking determining the target access point based on the preset rule as an example, how to determine the target access point based on the access point information of the at least one access point is explained below. FIG. 6 shows a flow chart of a method of determining the target access point, which includes the following steps.

At step S51, a candidate connection list is determined based on the access point information of the at least one access point.

The candidate connection list at least includes the information of the at least one access point, such as the name of the access point, the frequency band of the access point, the signal strength of the access point, and so on.

At step S52, the access points in the candidate connection list are screened based on a first preset rule.

At step S53, the screened access points are prioritized based on a second preset rule.

At step S54, the access point with a highest priority is determined as the target access point.

In the embodiments of the present disclosure, the access point with the highest priority is determined as the target access point based on the preset rules, so that the multi-link device can be connected with the target access device corresponding to the target access point based on a better target access point, thus expanding the application scenarios of the multi-link device and achieving the great compatibility while ensuring the communication quality.

In some embodiments, the first preset rule is that the service set identifier and the corresponding encryption type of the access point do not match. That is, if the service set identifier and the corresponding encryption type of the access point in the candidate connection list do not match, the access point whose service set identifier and corresponding encryption type do not match in the candidate connection list is screened out, so as to ensure the success rate of the multi-link device being connected with the access point device through the access point.

In some embodiments, the second preset rule includes at least one of the following: the frequency band of the access point, the signal strength of the access point, or the encryption type of the access point.

For example, the screened access points are prioritized according to their signal strengths, and the access point with the best signal strength is determined as the target access point.

Based on the same concept, the embodiments of the present disclosure also provide a communication device.

The communication device according to the embodiments of the present disclosure may include corresponding hardware structures and/or software modules configured to perform the various functions. In combination with the units and algorithm steps of the examples disclosed in the embodiments of the present disclosure, the embodiments of the present disclosure can be implemented in the form of hardware or a combination of hardware and computer software. Whether a function is executed by hardware or in the form of computer software driving hardware depends on the specific application and design constraints of the technical solution. Those skilled in the art may use different methods to realize the described functions for each specific application, but this realization should not be considered beyond the scope of the technical solutions of the embodiments of the present disclosure.

Figure 7:
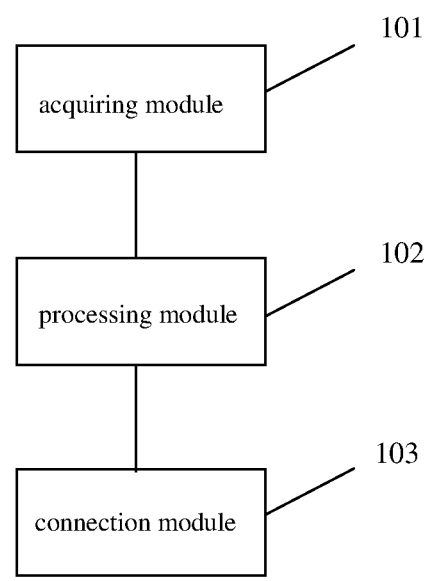
FIG. 7 is a block diagram of a communication device according to an embodiment.

FIG. 7 is a block diagram of a communication device according to an embodiment. Referring to FIG. 7, the device includes an acquiring module 101, a processing module 102 and a connection module 103.

The acquiring module 101 is configured to acquire access point information of at least one access point.

The processing module 102 is configured to determine a target access point based on the access point information of the at least one access point, and to determine a target connection manner of establishing a connection with a target access device corresponding to the target access point based on first access point information of the target access point. The target connection manner includes a multi-link connection manner or a wireless connection manner.

The connection module 103 is configured to establish a connection with the target access device based on the target connection manner.

In an embodiment, the processing module 102 is configured to: determine that the first access point information of the target access point includes first information, and acquire an access point identifier and reduced neighbor report information included in the first access point information, in which the first information is used to indicate that a capability of the target access device corresponding to the target access point supporting the multi-link connection manner, the access point identifier is used to identify the target access device corresponding to the target access point, and the reduced neighbor report information is used to indicate second access point information of a cooperative access point of the target access point, in which the target access point and the cooperative access point are associated with the same target access device, and the access points associated with the same target access device have the same access point identifier: determine the second access point information of the cooperative access point based on the reduced neighbor report information: and determine that the target connection manner of establishing the connection with the target access device corresponding to the target access point is the multi-link connection manner, if the second access point information includes the access point identifier.

In an embodiment, the reduced neighbor report information includes channel information of the cooperative access point: the processing module 102 is configured to determine a working channel of the cooperative access point based on the reduced neighbor report information, and receive the second access point information of the cooperative access point in the working channel of the cooperative access point.

In an embodiment, the processing module 102 is configured to: determine a frequency band corresponding to the cooperative access point based on the reduced neighbor report information: determine the working channel of the cooperative access point and receive the second access point information of the cooperative access point in the working channel of the cooperative access point, when the multi-link device supports the frequency band corresponding to the cooperative access point.

In an embodiment, the connection module 103 is configured to establish the multi-link connection with the target access device on the frequency band corresponding to the target access point and the frequency band corresponding to the cooperative access point based on the multi-link connection manner.

In an embodiment, the processing module 102 is configured to determine that the target connection manner of establishing the connection with the target access device corresponding to the target access point is the wireless connection manner, if the first access point information of the target access point does not include the first information, and/or the multi-link device does not support the frequency band corresponding to the cooperative access point of the target access point.

In an embodiment, the connection module 103 is configured to establish the wireless connection with the target access device on the frequency band corresponding to the target access point based on the wireless connection manner.

In an embodiment, the acquiring module 101 is configured to acquire a message frame sent by the at least one access point, in which the message frame includes a beacon frame and/or a probe response frame, and to determine the access point information of the at least one access point based on the message frame.

In an embodiment, the processing module 102 is configured to determine a candidate connection list based on the access point information of the at least one access point, screen access points in the candidate connection list based on a first preset rule, prioritize the screened access points based on a second preset rule, and determine the access point with the highest priority as the target access point.

In an embodiment, the first preset rule is that a service set identifier and a corresponding encryption type of the access point do not match.

In an embodiment, the second preset rule includes at least one of the following: a frequency band, a signal strength, or an encryption type of the access point.

With regard to the device in the above embodiments, the specific manners in which the various modules perform operations have been detailed in the embodiments related to the method, and will not be elaborated herein.

Figure 8:
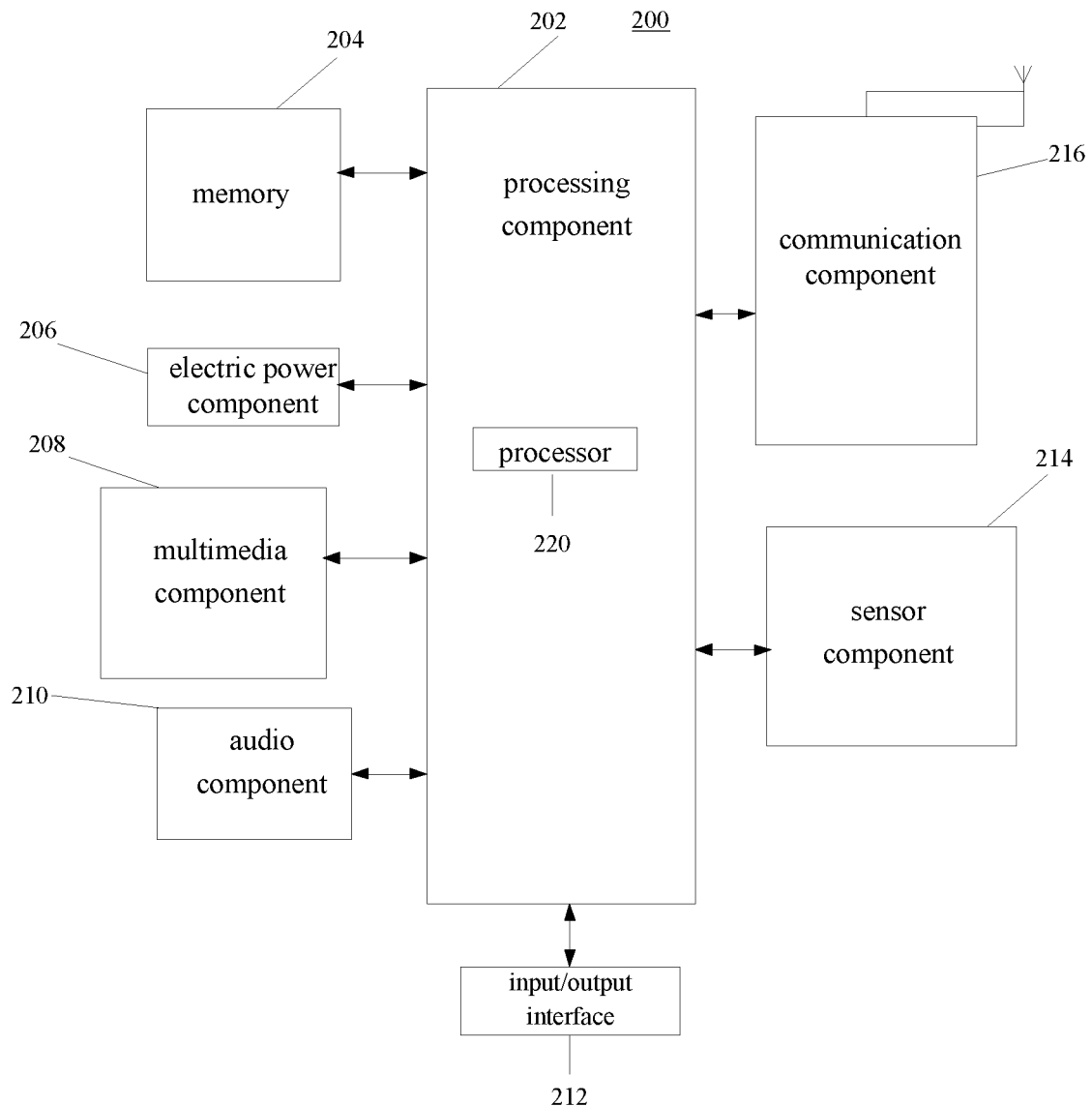
FIG. 8 is a block diagram of a communication device according to an embodiment.

FIG. 8 is a block diagram of a communication device 200 according to an embodiment. For example, the device 200 may be a mobile phone, a computer, a digital broadcast device, a messaging device, a game console, a tablet device, a medical device, a fitness device, a personal digital assistant, and the like.

As illustrated in FIG. 8, the device 200 may include one or more components of the followings: a processing component 202, a memory 204, an electric power component 206, a multimedia component 208, an audio component 210, an input/output (I/O) interface 212, a sensor component 214 and a communication component 216.

The processing component 202 usually controls an overall operation of the device 200, such as operations associated with display, telephone calls, data communications, camera operations, and recording operations. The processing component 202 may include one or more processors 220 to execute instructions, to complete all or part of the steps in the above methods. In addition, the processing component 202 may include one or more modules which facilitate interaction between the processing component 202 and other components. For example, the processing component 202 may include a multimedia module to facilitate interaction between the multimedia component 208 and the processing component 202.

The memory 204 is configured to store various types of data to support operations at the device 200. Examples of such data include instructions for any application programs or methods operated on the device 200, contact data, phonebook data, messages, pictures, videos, etc. The memory 204 may be implemented by any type of volatile or non-volatile storage devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The electric power component 206 provides electric power to various components of the device 200. The electric power component 206 may include a power management system, one or more power sources, and other components related to generation, management, and distribution of electric power in the device 200.

The multimedia component 208 includes a screen that provides an output interface between the device 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 208 includes a front camera and/or a rear camera. When the device 200 is in an operation mode, such as a photographing mode or a video mode, the front camera and/or the rear camera may receive external multimedia data. Each of the front and rear cameras may be a fixed optical lens system or have a focus and optical zoom capability.

The audio component 210 is configured to output and/or input audio signals. For example, the audio component 210 includes a microphone (MIC) configured to receive an external audio signal when the device 200 is in an operating mode, such as a call mode, a recording mode, and a speech recognition mode. The received audio signal may be further stored in the memory 204 or transmitted via the communication component 216. In some embodiments, the audio component 210 further includes a loudspeaker, which is configured to output the audio signals.

The I/O interface 212 provides an interface between the processing component 202 and a peripheral interface module, such as a keyboard, a click wheel, a button and the like. The buttons may include, but are not limited to, a home button, a volume button, a starting button, and a locking button.

The sensor component 214 includes one or more sensors for providing state assessments of various aspects of the device 200. For example, the sensor component 214 may detect an on/off state of the device 200, a relative positioning of the components, such as the display and the keypad of the device 200, a change in position of the device 200 or of a component of the device 200, a presence or an absence of the user's contact with the device 200, an orientation or an acceleration/deceleration of the device 200, and a change in temperature of the device 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate wired or wireless communication between the device 200 and other devices. The device 200 can access a wireless network based on a communication standard, such as Wi-Fi, 2G, 3G, 4G, 5G, or 6G, or a combination of them. In an embodiment, the communication component 216 receives a broadcast signal or broadcast related information from an external broadcast management system via a broadcast channel. In an embodiment, the communication component 216 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the device 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods described above.

In an embodiment, there is also provided a non-transitory computer readable storage medium including instructions, such as the memory 204 including instructions. The instructions can be executed by the processor 220 of the device 200 to perform the methods described above. For example, the non-transitory computer readable storage medium may be a ROM, a random access memory (RAM), a CD-ROM, a magnetic tape, a floppy disk, an optical data storage device, and the like.

It may be further understood that "a plurality of" in the present disclosure indicates two or more, and other quantifiers are similar to this. The term "and/or" describes an association relationship of associated objects, indicating that three relationships may exist. For example, A and/or B may represent the following three cases: Only A exists, both A and B exist, and only B exists. The character "/" generally indicates that the associated former and latter objects are in an "or" relationship. The singular forms "a/an", "one", and "the" are also intended to include plural forms, unless otherwise clearly specified in the context.

It may be further understood that the terms "first", "second", etc. are used to describe various information, but the information should not be limited to these terms. These terms are only used to distinguish the same type of information from each other, and do not indicate a specific order or degree of importance. In fact, the terms such as "first" and "second" may be used interchangeably. For example, without departing from the scope of the present disclosure, the first information may also be referred to as the second information, and similarly, the second information may also be referred to as the first information.

It may be further understood that, unless otherwise specified, "connection" includes both direct connection with no other components between two and indirect connection with other elements between two.

It may be further understood that, although the operations are described in a specific order in the drawings in the embodiments of the present disclosure, it should not be understood that the operations are required to be performed in the shown specific order or in a serial order, or all the shown operations need to be performed to get a desired result. In specific circumstances, multitasking and parallel processing may be advantageous.

Those skilled in the art will be aware of other embodiments of the present disclosure after considering the specification and practicing the invention disclosed herein. The present application is intended to cover any variations, uses, or adaptive changes of the present disclosure, which follow the general principles of the present disclosure and include common knowledge or conventional technical means in the technical field not disclosed in the present disclosure.

It may be appreciated that the present disclosure is not limited to the exact structure that has been described above and illustrated in the accompanying drawings, and that various modifications and changes may be made without departing from the scope of the present disclosure. The scope of the present disclosure is only limited by the appended claims.

What is claimed is:

1. A communication method, applied to a multi-link device, the method comprising:
   acquiring access point information of at least one access point;
   determining a target access point based on the access point information of the at least one access point;
   determining a target connection manner of establishing a connection with a target access device corresponding to the target access point based on first access point information of the target access point, wherein the target connection manner comprises at least one of a multi-link connection manner or a wireless connection manner; and establishing the connection with the target access device based on the target connection manner;

wherein in a case that the first access point information of the target access point comprises first information, the target connection manner is the multi-link connection manner or the wireless connection manner, wherein the first information is configured to indicate a capability of the target access device corresponding to the target access point supporting the multi-link connection manner; and in a case that the first access point information of the target access point does not comprise the first information, the target connection manner is the wireless connection manner.

2. The communication method according to claim 1, wherein determining the target connection manner of establishing the connection with the target access device comprises:

determining that the first access point information of the target access point comprises the first information, acquiring an access point identifier and reduced neighbor report information comprised in the first access point information, wherein the access point identifier is configured to identify the target access device corresponding to the target access point, and the reduced neighbor report information is configured to indicate second access point information of a cooperative access point of the target access point, wherein the target access point and the cooperative access point are associated with a same target access device, and access points associated with the same target access device have a same access point identifier;

determining the second access point information of the cooperative access point based on the reduced neighbor report information; and determining that the target connection manner of establishing the connection with the target access device corresponding to the target access point is the multi-link connection manner, in response to determining that the second access point information comprises the access point identifier.

3. The communication method according to claim 2, wherein the reduced neighbor report information comprises channel information of the cooperative access point; and determining the second access point information of the cooperative access point based on the reduced neighbor report information comprises:

determining a working channel of the cooperative access point based on the reduced neighbor report information, and receiving the second access point information of the cooperative access point in the working channel of the cooperative access point.

4. The communication method according to claim 3, wherein determining the working channel of the cooperative access point based on the reduced neighbor report information, and receiving the second access point information of the cooperative access point in the working channel of the cooperative access point, comprises:

determining a frequency band corresponding to the cooperative access point based on the reduced neighbor report information; and in response to determining that the multi-link device supports the frequency band corresponding to the cooperative access point, determining the working channel of the cooperative access point, and receiving the second access point information of the cooperative access point in the working channel of the cooperative access point.

5. The communication method according to claim 4, wherein establishing the connection with the target access device based on the target connection manner comprises:

establishing a multi-link connection with the target access device on a frequency band corresponding to the target access point and the frequency band corresponding to the cooperative access point based on the multi-link connection manner.

6. The communication method according to claim 1, wherein determining the target connection manner of establishing the connection with the target access device comprises:

in response to determining at least one of: the first access point information of the target access point not comprising the first information, or the multi-link device not supporting a frequency band corresponding to a cooperative access point of the target access point, determining that the target connection manner of establishing the connection with the target access device corresponding to the target access point is the wireless connection manner.

7. The communication method according to claim 6, wherein establishing the connection with the target access device based on the target connection manner comprises:

establishing a wireless connection with the target access device on a frequency band corresponding to the target access point based on the wireless connection manner.

8. The communication method according to claim 1, wherein acquiring access point information of at least one access point comprises:

acquiring a message frame sent by the at least one access point, wherein the message frame comprises at least one of a beacon frame or a probe response frame; and determining the access point information of the at least one access point based on the message frame.

9. The communication method according to claim 8, wherein determining the target access point based on the access point information of the at least one access point comprises:

determining a candidate connection list based on the access point information of the at least one access point;

screening access points in the candidate connection list based on a first preset rule;

prioritizing the screened access points based on a second preset rule; and determining the access point with a highest priority as the target access point.

10. The communication method according to claim 9, wherein the first preset rule is that a service set identifier and a corresponding encryption type of a screened access point do not match.

11. The communication method according to claim 9, wherein the second preset rule comprises at least one of: a frequency band, a signal strength, or an encryption type of the screened access point.

12. A communication device, comprising:

a processor; and a memory configured to store instructions executable the processor, wherein the processor is configured to:

acquire access point information of at least one access point;

determine a target access point based on the access point information of the at least one access point;

determine a target connection manner of establishing a connection with a target access device corresponding to the target access point based on first access point information of the target access point, wherein the target connection manner comprises at least one of a multi-link connection manner or a wireless connection manner; and establish the connection with the target access device based on the target connection manner;

wherein in a case that the first access point information of the target access point comprises first information, the target connection manner is the multi-link connection manner or the wireless connection manner, wherein the first information is configured to indicate a capability of the target access device corresponding to the target access point supporting the multi-link connection manner; and in a case that the first access point information of the target access point does not comprise the first information, the target connection manner is the wireless connection manner.

13. The communication device according to claim 12, wherein the processor is further configured to:

determine that the first access point information of the target access point includes the first information, and acquire an access point identifier and reduced neighbor report information comprises in the first access point information, wherein the access point identifier is configured to identify the target access device corresponding to the target access point, and the reduced neighbor report information is configured to indicate second access point information of a cooperative access point of the target access point, wherein the target access point and the cooperative access point are associated with a same target access device, and the access points associated with the same target access device have a same access point identifier;

determine the second access point information of the cooperative access point based on the reduced neighbor report information; and determine that the target connection manner of establishing the connection with the target access device corresponding to the target access point is the multi-link connection manner, in response to determining that the second access point information comprises the access point identifier.

14. The communication device according to claim 13, wherein the reduced neighbor report information comprises channel information of the cooperative access point; and the processor is further configured to determine a working channel of the cooperative access point based on the reduced neighbor report information, and receive the second access point information of the cooperative access point in the working channel of the cooperative access point.

15. The communication device according to claim 14, wherein the processor is further configured to:

determine a frequency band corresponding to the cooperative access point based on the reduced neighbor report information; and determine the working channel of the cooperative access point and receive the second access point information of the cooperative access point in the working channel of the cooperative access point, in response to determining that the communication device supports the frequency band corresponding to the cooperative access point.

16. The communication device according to claim 15, wherein the processor is further configured to establish a multi-link connection with the target access device on a frequency band corresponding to the target access point and the frequency band corresponding to the cooperative access point based on the multi-link connection manner.

17. The communication device according to claim 12, wherein the processor is further configured to determine that the target connection manner of establishing the connection with the target access device corresponding to the target access point is the wireless connection manner, in response to determining at least one of: the first access point information of the target access point comprising no first information, or the communication device not supporting a frequency band corresponding to a cooperative access point of the target access point.

18. The communication device according to claim 17, wherein the processor is further configured to establish a wireless connection with the target access device on a frequency band corresponding to the target access point based on the wireless connection manner.

19. The communication device according to claim 12, wherein the processor is further configured to:

acquire a message frame sent by the at least one access point, wherein the message frame comprises at least one of a beacon frame or a probe response frame; and determine the access point information of the at least one access point based on the message frame.

20. A non-transitory computer-readable storage medium having stored therein instructions that, when executed by a processor of a terminal, cause the terminal to perform:

acquiring access point information of at least one access point;

determining a target access point based on the access point information of the at least one access point;

determining a target connection manner of establishing a connection with a target access device corresponding to the target access point based on first access point information of the target access point, wherein the target connection manner comprises at least one of a multi-link connection manner or a wireless connection manner; and establishing the connection with the target access device based on the target connection manner;

wherein in a case that the first access point information of the target access point comprises first information, the target connection manner is the multi-link connection manner or the wireless connection manner, wherein the first information is configured to indicate a capability of the target access device corresponding to the target access point supporting the multi-link connection manner; and in a case that the first access point information of the target access point does not comprise the first information, the target connection manner is the wireless connection manner.

* * * * *